(12) United States Patent
Sugiyama et al.

(10) Patent No.: US 6,339,310 B1
(45) Date of Patent: Jan. 15, 2002

(54) MOTOR DRIVING CONTROL DEVICE

(75) Inventors: Masanori Sugiyama; Hiroyuki Inagaki; Yoshihide Suzuki, all of Aichi-ken (JP)

(73) Assignee: Aisin Seiki Kabushiki Kabushiki, Aichi-Ken (JP)

( * ) Notice: Subject to any disclaimer, the term of this patent is extended or adjusted under 35 U.S.C. 154(b) by 0 days.

(21) Appl. No.: 09/651,733

(22) Filed: Aug. 30, 2000

(30) Foreign Application Priority Data

Aug. 30, 1999 (JP) .......................................... 11-243077

(51) Int. Cl.[7] .............................. H02P 5/05; H02H 7/08; H02H 5/04
(52) U.S. Cl. ....................... 318/783; 318/492; 318/701; 318/254; 318/473; 361/24; 361/25; 361/103
(58) Field of Search ................................. 318/783, 696, 318/701, 254, 439, 492, 473, 472, 434; 494/7, 10, 14, 37, 61; 123/179 H, 145 A, 179 BG; 307/270, 310; 364/488, 489; 374/173, 101

(56) References Cited

U.S. PATENT DOCUMENTS

| | | | |
|---|---|---|---|
| 4,399,781 A | * | 8/1983 | Tsukasaki |
| 4,924,112 A | * | 5/1990 | Anderson et al. |
| 5,431,620 A | * | 7/1995 | Schenck et al. |
| 5,509,881 A | * | 4/1996 | Sharples |
| 5,838,133 A | * | 11/1998 | McCann |
| 5,838,578 A | * | 11/1998 | Pippin |
| 5,872,441 A | * | 2/1999 | McCann |
| 5,936,820 A | * | 8/1999 | Umemura et al. |
| 6,014,003 A | * | 1/2000 | French |
| 6,100,660 A | * | 8/2000 | Ikeyama et al. |
| 2001/0010453 | * | 8/2001 | Marcinkiewicz |

FOREIGN PATENT DOCUMENTS

| | | | |
|---|---|---|---|
| JP | 10-337084 | | 12/1998 |
| JP | 11-136984 | * | 5/1999 |

* cited by examiner

Primary Examiner—Paul Ip
(74) Attorney, Agent, or Firm—Sughrue Mion, PLLC

(57) ABSTRACT

A motor driving control device that achieves as high as possible phase coil energization level while preventing thermal destruction of the power switching element by using precise thermal detection of a portion of the power switching element inside a switching module of the control device. An electric power loss Lt at the switching element is used for calculating a saturation temperature Tjgoal. On the basis of the saturation temperature, Tjgoal, and a time constant τ of temperature rise, an instant junction temperature Tjnow is calculated. A difference Error between the instant junction temperature Tjnow and an upper temperature limit value Tjmax is calculated. In a motor locked condition, a coefficient Kt is calculated for the target torque, the target torque being equal to the required torque multiplied by Kt. Kt is based on the Error for calculating the target torque. If Error is greater than or equal to a predetermined value, K3, Kt is set to be 1, even if Kt is in excess of 1. If Error is less than or equal to 0, Kt is set to be zero.

8 Claims, 4 Drawing Sheets

MOTOR DRIVING CONTROL DEVICE

BACKGROUND OF THE INVENTION

RELATED APPLICATION

The present invention claims priority from Japanese Patent Application No. 11 (1999)-243077, which is incorporated by reference herein in its entirety.

FIELD OF THE INVENTION

The present invention is directed to a motor driving control device. Specifically, the present invention is related to a motor driving control device in which a motor driver is operated to be free from possible heat breakage or destruction while the rotor of the motor rotates at a very low speed or is in locked condition.

BACKGROUND DISCUSSION

For example, in order to drive a switched reluctance motor, hereinafter referred to as an SR motor, a switching module (IPM) is used. The switching module includes a pair of chopping energization circuits, each of which has an insulating gate type bipolar transistor (IGBT), that are provided to a phase coil. Thus, if the SR motor is of three phases, the SR motor has six chopping circuits (2×3) in total, and these chopping circuits are assembled into the switching module (IPM). In the case where the SR motor is mounted on an electrically powered vehicle for driving wheels, the SR motor is energized when the electrically powered vehicle is started and decelerated. Under such conditions, the wheels are rotated at a very slow speed and stopped, and, therefore, the SR motor is rotated at a very slow speed and stopped, respectively. Thus, a motor lock occurs very frequently.

In the locked condition, the electric coil of a specific phase is made to be energized in continuous fashion, which may make the temperature of the IGBT rise above its heat proof temperature or upper temperature limit. Thus, under the possible motor locked conditions, a protection design has to be made in order to prevent the heat breakage (or destruction) or malfunction of the switching module. Of course, for the vehicle to travel, it is also necessary to energize the motor.

The inventors of the present invention have proposed a motor driving control device for the prevention of the heat breakage of a switching module that has been published as Japanese Laid-open Print No. Hei. 10-337084. In this device, while a switching module is being monitored by a temperature sensor, a target current value is adjusted or corrected on the basis of the temperature changing speed that corresponds to the current flowing through the switching element, as a load, of the module. The temperature changing speed becomes higher and lower when the detected current passing through the load is large and small, respectively. The temperature of the individual phase switching element in the switching module is calculated or estimated and, correspondingly, the motor driving current is adjusted.

In this device, the temperature rise inside the switching module is calculated in estimating fashion on the basis of the temperature changing speed (estimated value) that corresponds to the energization current value. This estimation is so rough that the motor fails to output its performance fully, giving priority to the prevention of heat destruction of the switching element. However, in light of the fact that in the motor locked condition a high output torque is required, the current passing through the phase coil has to be as large as possible. According to the inventors' experiments, while the SR or electric motor is in rotation in steady fashion, the current flowing through the phase coil fails to increase excessively, so that the switching module is not brought into heat destruction. Thus, under motor locked condition, a more strict in-module temperature estimation and as high as possible energization level of phase coil (flowing current through the phase coil) within a range which is free from thermal destruction are desired.

SUMMARY OF THE INVENTION

It is, therefore, a principal object of the present invention to provide a motor driving control device in which as high as possible phase coil energization level is achieved while also preventing thermal destruction of the power switching element by using a more precise thermal detection of a portion of a power switching element inside the switching module that is subject to thermal destruction or breakage.

In order to attain the foregoing object, a first aspect of the present invention provides a motor driving control device, including:

a switching module having therein a power switching element for energizing an electric coil of a motor;

energization indication means for providing an energization indication signal to the switching module for energization of the electric coil;

calculation means for calculating a saturation temperature of the switching element generated by the heat generated by an electric loss which results from the continuous energization of the electric coil, the calculation means calculating an inner temperature of the switching element based on the calculated saturation temperature and a time constant τ of a temperature rise by the generated heat, assuming that the temperature rise is made in first order lag in response to the increase of the heat capacity; and means for decreasing the current to be applied to the electric coil in accordance with the temperature difference between an upper limit temperature of the power switching element and the calculated inner temperature of the power switching element.

The current to be applied to the electric coil through the energization indication means is decreased when the temperature difference is equal to or below a predetermined value, the current decrease becoming bigger as the temperature difference becomes smaller.

The heat generation inside the module generates at a junction in the switching element, and, therefore, thermal destruction occurs thereat. The electric power consumed at the junction or electric power loss (Lt) depends on the specification of the power switching element and amounts of energizing current and voltage and, therefore, can be calculated precisely according to the specification of power switching element. When the heat generated by the electric power loss (Lt) is converted into a temperature according to the thermal resistance of the element, such a temperature is a saturation temperature which can be attained when the energization is continued and is calculated in relatively precise fashion. The junction temperature Tjnow of the power switching element can be obtained on the basis of the saturation temperature and a time constant τ of a temperature rise by the generated heat subject to that the temperature rise is made in first order lag fashion relative to the increasing heat amount. These calculations or estimations are high in precision and, therefore, the value of the obtained junction temperature (Tjnow) is very reliable.

On the other hand, the upper temperature limit (Tjmax) of the switching element is provided together with the module by the manufacturer thereof and is highly reliable. If the difference, Error (Error=Tjmax−Tjnow), between the detected inner temperature (Tjnow) and the upper temperature limit (Tjmax) becomes equal to or less than a predetermined value (K3), the decreasing degree of the current flowing through the electric coil becomes greater as the difference becomes smaller, so that the thermal destruction of the power switching element can be prevented. In addition, the junction temperature (Tjnow) is kept below or less than the upper temperature limit (Tjmax), and a relatively high current can be made to flow through the electric coil producing as high as possible torque.

A second aspect of the present invention is to add, to the device according to the first aspect, detection means (1d, 11) for detecting a rotation number (or speed) of the motor (1). Such a driving control device operates as follows: the means (11) for calculating the electric power loss (Lt) and the means for calculating the junction temperature (Tjnow) make calculations only when the motor rotation number is less than the motor lock judging threshold value (e.g., 10 rpm). The current decreasing means (11) decreases the current only when the motor rotation number is less than the motor lock judging threshold value (e.g., 10 rpm).

When the motor is not in its locked condition, a large output torque is not required, which results in that the target current value is low and the motor current fails to become excessive, so that no current flows through the switching element inside the module that increases the junction temperature over the upper temperature limit (Tjmax). Thus, the normally operated switching element is free from thermal destruction, which means that detecting the junction temperature (Tjnow) is unnecessary. Thus, in light of such circumstances, the foregoing three means are made to be at rest for reducing the respective jobs.

A third aspect of the present invention is to operate the current decreasing means (11) for decreasing current under proportional control (step 90 in FIG. 3 and steps 65 and 66 in FIG. 2) which is based on the difference (Error=Tjmax−Tjnow) between the junction temperature (Tjnow) and the upper temperature limit (Tjmax). According to this aspect, whenever there is a motor locked condition, the junction temperature (Tjnow) is kept automatically below or less than the upper temperature limit (Tjmax) and a relatively high current can be caused to flow through the electric coil to produce as high as possible torque. Thus, ideal motor driving can be realized even when the motor is in its locked condition.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which.

DETAILED DESCRIPTION OF THE PRESENT INVENTION

Figure 1:
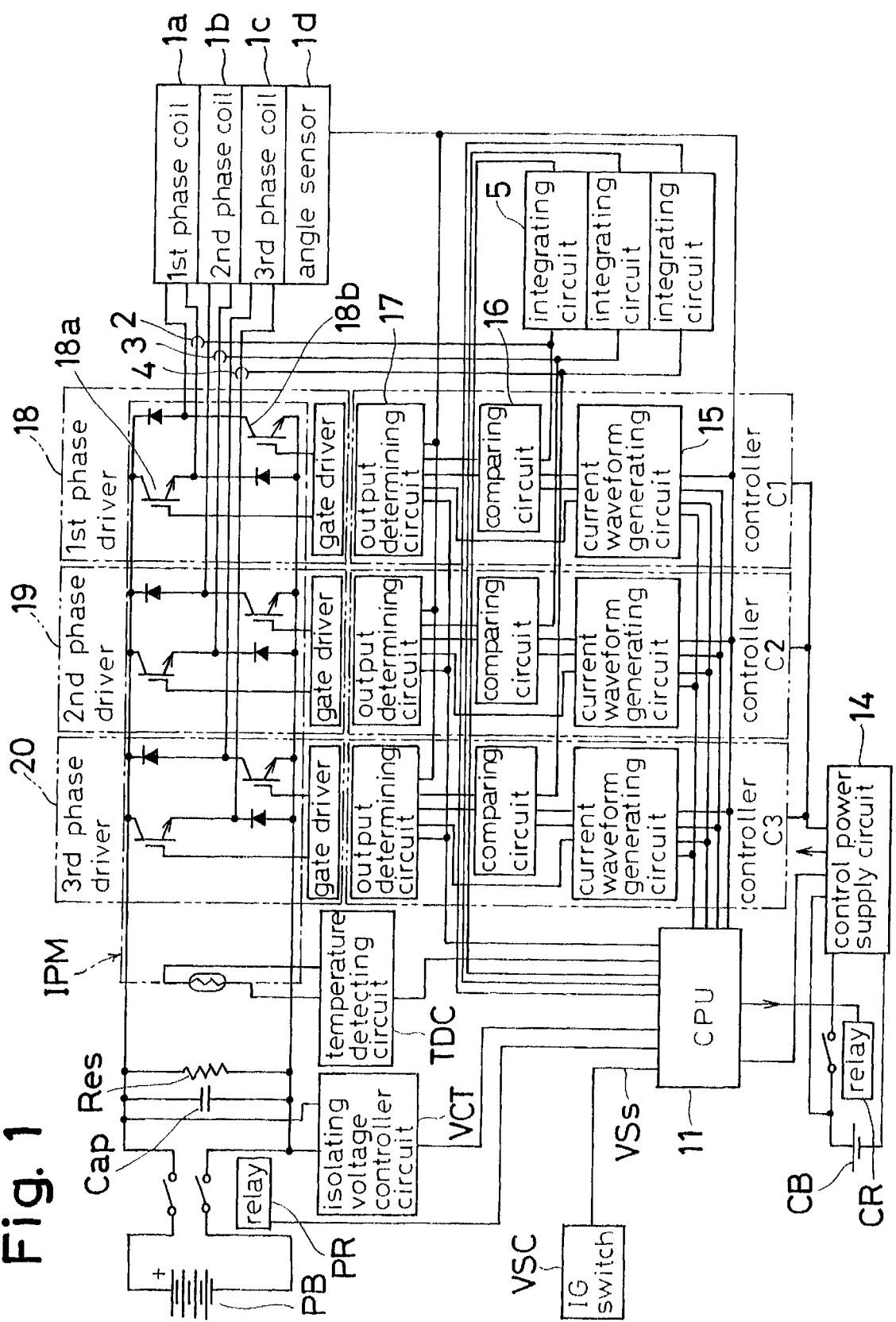
FIG. 1 illustrates a block diagram of a motor driving control device according to an embodiment of the present invention.

A preferred embodiment of the present invention is illustrated in FIG. 1. The apparatus that is illustrated in FIG. 1 constitutes a main or principal portion of an electric motor driving unit of a hybrid electric powered vehicle on which are mounted an internal combustion engine and a switched reluctance motor (hereinafter abbreviated to SR motor) for driving wheels of the hybrid electric powered vehicle. In this example or illustrated structure, a single SR motor 1 is provided, as an electric driving source, which is under the control of a CPU 11 of an electric controller. State signals from a shift lever switch, a brake switch, an accelerator switch, and an accelerator sensor switch, respectively, and a demand signal from an accelerator opening sensor are inputted into the CPU 11 through an input/output interface (not shown) of the system controller. On the basis of information from these signals, the CPU 11 controls the SR motor 1.

The SR motor 1 includes, for the driving thereof, three phase coils 1a, 1b, and 1c and an angle sensor 1d for detecting an angular position of a rotor (not shown) of the SR motor 1. The phase coils 1a, 1b, and 1c are connected to motor drivers 18, 19, and 20, respectively. A current sensor 2 is disposed in a line connecting the phase coil 1a and the motor driver 18. A current sensor 3 is disposed in a line connecting the phase coil 1b and the motor driver 19. A current sensor 4 is disposed in a line connecting the phase coil 1c and the motor driver 20. These current sensors 2, 3, and 4 output voltages as current signals, which are in proportion to actual currents flowing through the respective phase coils 1a, 1b, and 1c, to three comparing circuits 16 and three integrating circuits 5. These current signals are noise-processed with short smoothing time constants and are equivalent to substantially instantaneous values. The integrating circuits 5 generate analogue voltages expressing time series averages of the currents of the phase coils and feed the same to an A/D conversion port of the CPU 11. The smoothing time constants of the integrating circuits 5 are long.

The CPU 11 feeds or issues energization commands (target currents) to current controllers C1 to C3 inclusive. The current controllers C1, C2, and C3 control currents passing or flowing through the first phase coil 1a, the second phase coil 1b, and the third phase coil 1c by way of the motor drivers 18, 19, and 20, respectively.

The current controller C1 has a current waveform generating circuit 15, the comparing circuit 16, and an output determining circuit 17. The current controllers C2 and C3 are identical with the current controller C1 in construction and function.

An on-vehicle mounted battery PB, which constitutes a d.c. power source for driving the electric motor, has a voltage output of about as high as 288 volts. The voltage of the battery PB is applied to motor drive supply lines when a driving power supply relay PR is turned on. A capacitor Cap and a resistor Res are connected to the supply lines for the absorption of ripples. Due to the fact that the motor driving current is as high as several hundred amperes, the capacitor Cap is of a capacitance of as large as about 8100 μF. However, the resistive value of the resistor Res is high in order to reduce electric power consumption. The discharge time constant of the parallel circuit of the capacitor Cap and the resistor Res is considerably large. Thus, if the driving power supply relay PR is turned off while all of the motor drivers 18, 19, and 20 are being turned off, the voltage of the capacitor Cap (the motor drive supply line voltage) is maintained or kept at a high value for a long time period or duration. In order to discharge this voltage in a short time duration, as will be detailed later, after turning the driving power supply relay PR on, the CPU 11 of the system controller issues a energization command to the current controllers C1, C2, and C3, which makes the motor drivers 18, 19, and 20 conductive, respectively, with the result that the static electric charge of the capacitor Cap is discharged into the phase coils 1a, 1b, and 1c of the SR motor 1.

In addition to the aforementioned driving power supply circuit, a control power supply battery CB and a control power supply circuit 14 are also provided. The control power supply circuit 14 includes two constant voltage circuits. One of the constant voltage circuits, which is of an extremely low power consumption, is directly connected to the battery CB and always feeds a constant voltage to the CPU 11. The other, which is of a relatively large power consumption, is connected, when a control power supply CR is turned on, to the battery CB for providing a control voltage to the current controllers C1, C2, and C3, (a control voltage line of) the motor drivers 18, 19, and 20, and various detectors and detecting circuits.

An operating voltage is always or continually fed to the CPU 11, irrespective of whether the control power supply relay CR is on or off. When a vehicle power supply throw signal VSs, expressing whether an ignition switch VSC mounted on the vehicle is turned on or off, changes from low level L, indicating that the ignition switch VSC is turned off, to high level H, indicating that the ignition switch VSC is turned on, the CPU 11 causes the control power supply relay CR and the driving power supply relay PR to turn on. When the vehicle power supply throw signal VSs changes from H (VSC on) to L (VSC off), the CPU 11 turns the driving power supply relay PR off, reads an output voltage of an isolating voltage converter circuit VCT after digital conversion thereof, and issues an energization command to the current controllers C1, C2, and C3 for energizing the respective phase coils 1a, 1b, and 1c, if such an output voltage of the isolating voltage converter circuit VCT is equal to or in excess of a predetermined value. If the output voltage of the isolating voltage converter circuit VCT becomes less than the predetermined value, the CPU 11 orders the current controllers C1, C2, and C3 to stop the energization of each of the phase coils 1a, 1b and 1c and turns the control power supply relay CR off.

The isolating voltage converter circuit VCT includes a saw-tooth waveform generation circuit, a voltage-dividing resistance circuit for dividing the voltage of the capacitor Cap, a comparing circuit for comparing a divisional voltage thus obtained with a saw-tooth wave and converting the divisional voltage into a PWM pulse signal (having a duty ratio), a photo coupler for transmitting the PWM pulse in isolating fashion, and a pulse width-voltage converting circuit for converting the resultant PWM pulse into an analog voltage. The isolating voltage converter circuit VCT feeds the analog voltage produced by the pulse width-voltage converting circuit to an A/D converting input port of the CPU 11. While the driving power supply relay PR is being turned on, the CPU 11 reads the output analog voltage of the isolating voltage converter circuit VCT after A/D conversion whenever power source supply information is required or at a predetermined cycle. When the relay PR is turned off, the CPU 11 continues to read the output analog voltage of the isolating voltage converter circuit VCT after A/D conversion and orders the current controllers C1, C2, and C3 to energize the SR motor until the read voltage drops below a set value.

During steady-state driving of the electric motor 1 (while the driving power supply relay PR is being turned on), the CPU 11 of the system controller successively computes or calculates a required direction, a driving speed, and a driving torque of the SR motor 1 on the basis of information inputted from the shift lever, the brake switch, the accelerator switch, and the accelerator opening sensor. Based on the results of such calculations, the CPU 11 controls the currents that flow through the respective phase coils 1a, 1b, and 1c of the SR motor 1.

The angle sensor 1d outputs or issues an eleven bit binary signal which is indicative of an absolute angle of 0 through 360 degrees. The angle sensor 1d has a minimum resolution of the detected angle of 0.5 degrees. On the basis of the least significant two bits of the signal outputted from the angle sensor 1d, the CPU 11 detects the direction (clockwise direction CW or counterclockwise CCW) of the rotor of the SR motor 1. The CPU 11 generates a direction detection signal S11 having a value H(1) and a value L(0) when the direction of rotation of the rotor is CV and CCW, respectively, and holds the resulting direction detection signal S11 in a resister (not shown) as well as feeding the resulting direction detection signal S11 to the output determining circuits 17.

One end of the first phase coil 1a is connected to a higher potential line of a power supply via a switching transistor (IGBT) 18a, while the other end of the first phase coil 1a is connected to a lower potential line of the power supply via a switching transistor (IGBT) 18b. In addition, a diode is interposed between the lower potential line and an emitter of the switching transistor 18a, while another diode is interposed between the higher potential line and an emitter of the switching transistor 18b. Thus, if both of the transistors 18a and 18b are turned on or become conductive, current flows through the phase coil 1a. If one or both of the switching transistors 18a and 18b are turned off or become nonconductive, it makes it possible to stop energizing the phase coil 1a.

On the basis of information inputted from the shift lever, the brake switch, the accelerator switch, and the accelerator opening sensor, the CPU 11 feeds a mode specifying signal (energization indication signal) S5 to the output determining circuit 17. The mode specifying signal S5 is set to have a value H indicating that soft chopping is possible when the required rotation direction of the SR motor 1, which is determined by the CPU 11, is in coincidence with an actual rotation direction of the SR motor 1 as detected by the CPU 11 (i.e., when the rotator rotates in a direction which is identical with the designated direction). To the contrary, when the rotator rotates in a direction which is in opposition to the designated direction, the mode specifying signal S5 is set to have a value L indicating that soft chopping is inhibited and hard chopping is designated.

The output determining circuit 17 compares a first reference voltage Vr1 outputted from the waveform generation circuit 15 and the voltage of current signal issued from the current sensor 2 and outputs the result of such a comparison as a binary signal S71 to a gate driver for forwarding to the transistor 18a. The output determining circuit 17 also compares a second reference voltage Vr2 outputted from the waveform generation circuit 15 and the voltage of current signal issued from the current sensor 2 and outputs the result of such a comparison as a binary signal S72 to a gate driver for forwarding to the transistor 18b. In this embodiment, a formula of Vr1<Vr2 is always established.

If the signal S5 outputted from the CPU 11 is indicative of H when the first phase coil 1a is designated to be energized, depending on magnitude relationship between the voltage Vs6 of current signal of the current sensor 2, the first reference voltage Vr1, and the second reference voltage Vr2, the state relationship between the switching transistors 18a and 18b is set to be one of the following three states.

|     |                             | Transistor 18a | Transistor 18b |
| --- | --------------------------- | -------------- | -------------- |
| (1) | Vs6 ≦ Vr1                   | ON             | ON             |
| (2) | Vr1 < Vs6 ≦ Vr2             | OFF            | ON             |
| (3) | Vr1 < Vs6 ≦ Vr2             | OFF            | OFF            |
| (4) | Vs6 > Vr2                   | OFF            | OFF            |

Repeating (1) and (4) in alternate fashion is said to be hard chopping, while repeating (1) and (2) in alternate fashion is said to be soft chopping. In case of the foregoing (3) Vr1≦Vs6<Vr2, though similar to the case (2), the transistors 18a and 18b should be turned off and off, respectively, in principle, due to the fact that the rotation direction of the electric motor 1 is in opposition to the designated or specified direction, for the prevention of transistor breakage, a changing is made so that the transistors 18a and 18b are on and off, respectively.

As mentioned above, there are conditions: one is to make both transistors 18a and 18b on, the second is to make both transistors 18a and 18b off, and the third is to make one and the other of the transistors 18a and 18b on and off, respectively. Which of these states is selected depends on whether the level of the voltage Vs6 of the current signal of the current sensor 2 is less than Vr1, between Vr1 and Vr2, or larger than Vr2, and whether or not the rotation direction of the rotor of the SR motor 1 is identical with the designated direction.

When the energization indication signal S5 is at low level L, which is indicative that the first phase coil 1a is ordered not to be energized, irrespective of the conditions of the respective signals S71 and S72 that are outputted from the comparing circuit 16, both of the transistors 18a and 18b are turned off or become nonconductive.

The rising-up characteristics or rising speed of current flowing through the phase coil 1a when both of the transistors 18a and 18b are turned on depends on the time constant of the circuit and can not be changed by controlling other factors. However, in light of the fact that the falling-down characteristics or falling speed of current when current interruption differs, depending on whether both of the transistors 18a and 18b are turned off or whether the transistor 18a is turned off while the transistor 18b remains on, adjusting the falling speed of current becomes possible. That is to say, when both of the transistors 18a and 18b are turned off the falling speed of current becomes faster, while when the transistor 18a is turned off while the transistor 18b remains on, the falling speed of current becomes slower.

In the case where almost no change is found in the target currents represented by the reference voltages Vr1 and Vr2, even if the lowering speed of current is slow, the deviation between the reference voltage Vr1 and the actual flowing current level Vs6 fails to increase, which maintains the relationship of Vs6<Vr2. Thus, at this time, there is little current variation. In addition, when at least one of the target currents represented by the reference voltages Vr1 and Vr2 is changed, for example, when the phase coil to be energized is changed, a condition under which Vs6>Vr2 occurs if the rising speed of current is slow. In such a case, both of the transistors 18a and 18b are turned off, which makes the falling speed of current faster, resulting in that the current changes quickly in response to the target currents represented by the reference voltages Vr1 and Vr2. When no change is found in the target currents, the deviation between the reference voltage Vr1 and the current level Vs6 becomes smaller, which makes the falling speed of current slower again. Thus, the prevention of current delay in response to the change of target value becomes possible. In addition, in case of little change in target value, the speed change of current is slow, which makes it possible to restrict or suppress vibrations and noise.

In case of switching the falling speed of current with usage of aforementioned signals S71 and S72 which are outputted from the output determining circuit 17, the actual switching timing is subject to delay from the suitable switching timing. In detail, though it is ideal to make the falling speed of current faster at the instant of abrupt lowering of the target value, a delay occurs due to the fact the signal S72 fails to becomes L so long as the current deviation is practically smaller. For this reason, when the target value changes very rapidly or quickly, there is a possibility of insufficient follow-up of current in response to the target value only with the automatic current speed change which uses the usage of signals S71 and S72.

In view of such circumstances, in this embodiment, controlling the energization indication signal S5 makes it possible to make the falling speed of current faster, irrespective of, or independent of, the magnitude of current Vs6. In other words, when the signal S5 is made to be lower level L, both of the transistors 18a and 18b are turned off or become nonconductive concurrently, which makes the falling speed of current faster.

The current waveform generation circuit 15 outputs or issues two kinds of reference voltages, Vr1 and Vr2, and the phase coil energization indication signal S5. The reference voltage Vr1, the reference voltage Vr2, and the phase coil energization indication signal S5 are generated or created based on information stored in a memory 15b (not shown), information store in a memory 15a (not shown), and information stored in a memory 15c (not shown), respectively. An 8 bit data read from the memory 15a is converted into an analogue voltage at a D/A converter 15g (not shown) which is built in the circuit 15 and the resulting signal becomes the reference voltage Vr2 after passing through an amplifier 15h (not shown). Similarly, an 8-bit data is also converted into an analogue voltage by being passed through a D/A converter, and thus, obtained analogue voltage becomes the reference voltage Vr1 after passing through an amplifier. A 1-bit data outputted from the memory 15c is used as the phase coil energization indication signal S5.

Each of the aforementioned not-illustrated memories 15a, 15b, and 15c has multiple addresses that correspond to the angular positions (in 0.5 degree units) of the rotor R of the SR motor 1. An address decoder of the current waveform generation circuit 15 creates address information based on an angular position signal detected by the angular sensor 1d. This address information is fed concurrently to address input terminals of the respective memories 15a, 15b, and 15c.

Thus, when the rotor R of the SR motor 1 rotates, the memories 15a, 15b, and 15c issue data from the respective addresses which correspond to the current angular position of the rotor R. Consequently, the reference voltages Vr1 and Vr2 and the phase coil energization indication signal S5 vary with the varying position of the rotor R which is in rotation.

Figure 5:
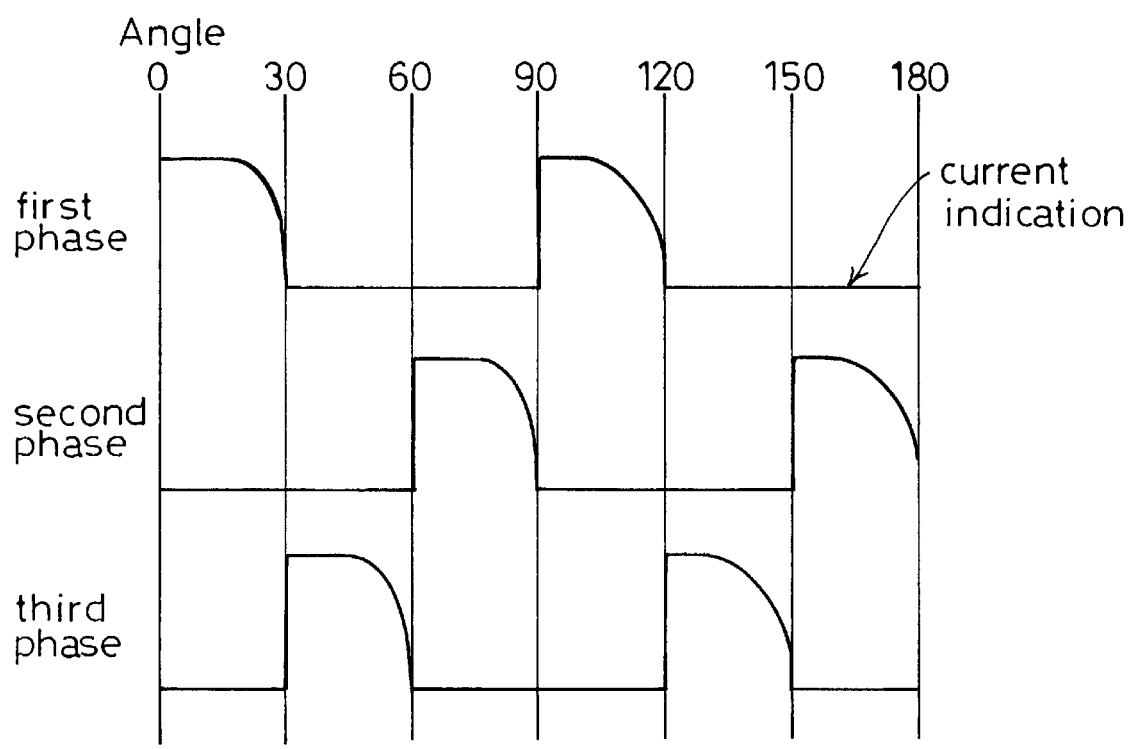
FIG. 5 is a time chart showing an example waveform for an energization current command for driving an SR motor 1 illustrated in FIG. 1.

In practice, due to the fact that a current having the illustrated waveform as shown in FIG. 5 flows through the phase coils 1a, 1b, and 1c, energization information is stored, as a map, in each of the memories 15a, 15b, and 15c. That is, in each address associated with each angular positions (in this embodiment, every 0.5 degrees), a target value of current to be set at the position is held. Due to the fact that information in the memory 15a and information in the memory 15b correspond to the reference voltages Vr2 and Vr1, respectively, the memory 15a is slightly different from the memory 15b in contents. As previously described, due to the fact that the level of current passing through the phase coil 1a is designed to change to follow up the variable reference voltage Vr1, storing the waveform of current which is desired to be caused to flow through the phase coil 1a as the reference voltages Vr1 and Vr2 in the respective memories 15a and 15b makes it possible to flow the current through the phase coils as depicted in FIG. 5.

In this embodiment, as illustrated in FIG. 5, though, whenever the rotor R rotates through an angle of 30 degrees, switching energization/de-energization of each of the phase coils 1a, 1b, and 1c should be made, registering the illustrated waveforms in FIG. 5 in the memories 15a and 15b makes it possible to establish the switching of energization/de-energization every 30 degrees in automatic fashion with the usage of signals S71 and S72. In brief, the CPU 11 itself is not requested to establish the switching of energization/de-energization of each phase coil.

As for the memory 15c, though most addressees hold an information "1" corresponding to high level H of the phase coil energization indication signal S5, some addresses hold an information "0", (compulsory interruption information) corresponding to angles at which the target currents Vr1 and Vr2 lower in drastic fashion. That is to say, when the rotor is at an angular position, for example, at an initiation point of the waveform of the target current to fall, where the falling inclination is very steep and it is expected that making the current speed change faster is desirable, without waiting for the automatic switching with the usage of the signal S72, the current change speed is made to be faster in compulsory fashion by making the signal S5 low level L on the basis information stored in the memory 15c. Thus, it becomes possible to avoid a time delay upon switching the current change speed, thereby improving the follow-up ability of current to the target value.

The memories 15a, 15b, and 15c are capable of having information written therein and read therefrom. The memories 15a, 15b, and 15c are connected to the CPU 11 by way of respective signal lines, and the CPU 11 may sometimes update the contents of the memories 15a, 15b, and 15c, if necessary.

Figure 2:
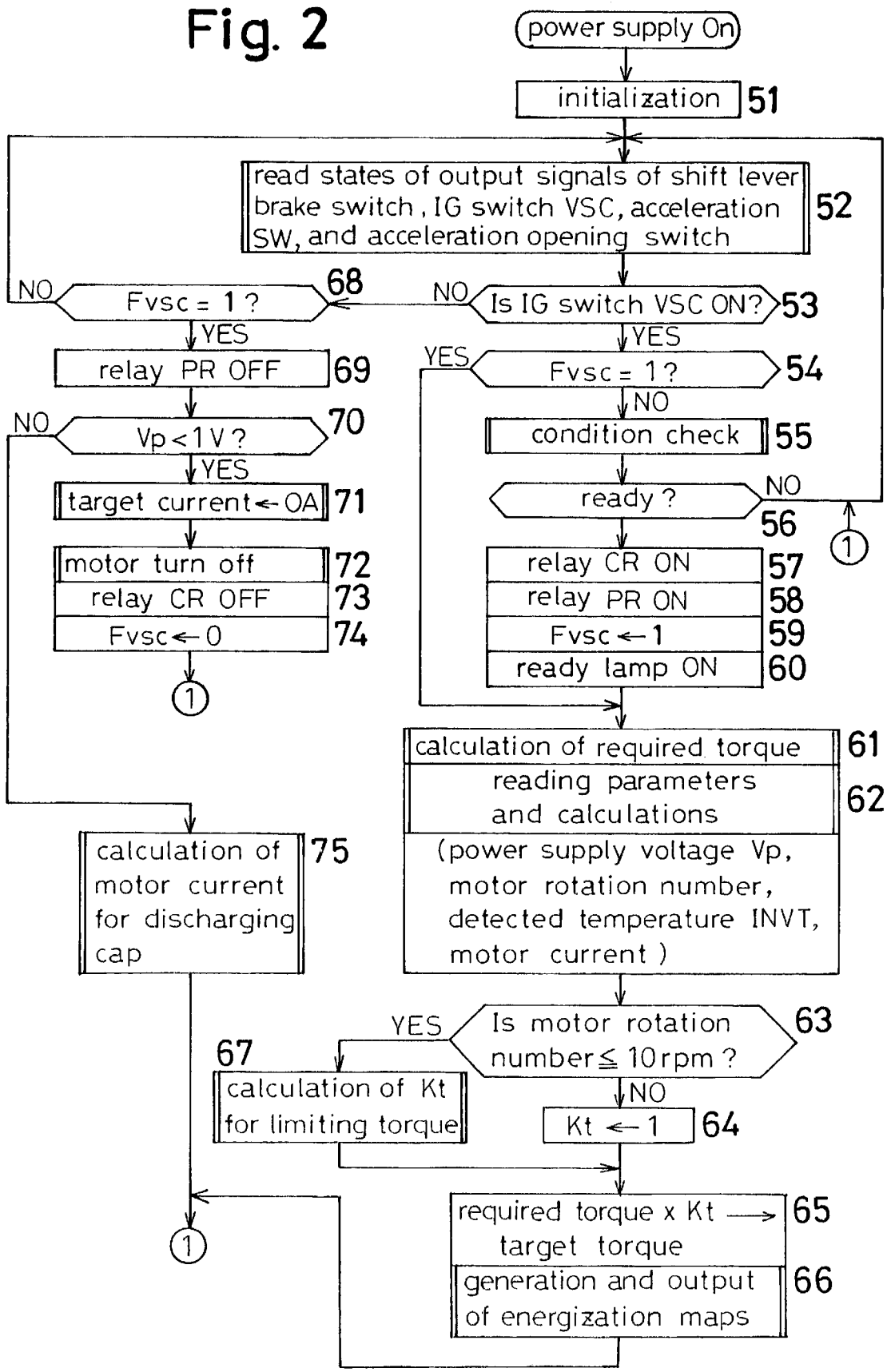
FIG. 2 illustrates a flowchart that is indicative of a program routine for the energization control function of a CPU 11.

With reference to FIG. 2, there is illustrated a flowchart which shows an overall operation of the CPU 11. When the power supply is turned on (i.e., the CPU 11 is applied with an operation voltage from the battery CB and the power supply circuit 14), at step 51, an initialization is made (i.e., the inner memories of the CPU 11 is initialized and an inner timer and mode settings for an interruption and so on are made). Thereafter, a system diagnosis is made and, if no abnormal conditions are found, the program routine goes to the next step.

At step 52, by way of the input interface 12, conditions of the signals outputted from the respective shift lever, brake switch, the ignition key switch VSC, acceleration switch, acceleration opening sensor, and the driving voltage Vp (the output analogue voltage of insolating voltage conversion circuit VCT) are read to store in the inner memories.

At step 53, it is checked whether or not the ignition key switch VSC is on (H). If the result is true or positive, at step 54, it is checked whether or not the on condition results from the latest switching from off condition with reference to the data stored in the resister Fvsc which represents "1" and "0" when the ignition key switch VSC has been turned on and not, respectively. If the result of step 53 is true, which is indicative that the on condition of the ignition key switch VSC is a newly established one, at step 55, a condition check is made. If normal condition is found at step 56, the control power supply relay CR is turned on (step 57), the driving power supply relay PR is turned on (step 58), the resister Fvsc is stored with "1" (step 59), and the ready lamp is turned on or lit (step 60).

Next, a required torque value is calculated (step 61). At this step, on the basis of detected conditions at step 52, the required rotation direction (designated direction) of the SR motor 1 is determined for determining the required torque value. For example, if the acceleration opening is increased which is detected by the acceleration opening sensor, the target driving torque is also increased. In addition, here, a torque changing flag is set which is indicative of the target torque change. At step 62, the driving voltage Vp (the output analogue voltage of isolating voltage conversion circuit VCT) is read, the rotation number of the SR motor 1 is calculated, a detection temperature $T_0$ of the temperature sensor TS attached to a switching element module IPM is read, and the motor current (the voltage of the integrating circuit 5) is read. In this embodiment, the bit data (i.e., angle detection data (11 bits)) of the angle sensor 1d varies with rotation of the SR motor 1. Due to the fact that the cycle thereof is in reverse proportion with the rotation of the SR motor 1, the CPU 11 measures the cyclic change of the lower bits of the data by means of interruption procedure and calculates the rotation number of the SR motor 1 on the basis of the resulting cycle.

Next, a torque correction coefficient Kt is calculated at steps 63, 64, and 67 as will be detailed later. The resulting or calculated torque correction coefficient Kt is multiplied with the required torque value calculated at step 61 to obtain a torque target value at step 65. Next at step 66, an energization map is generated or created which is indicative of current pattern shown in FIG. 5 so as to correlate the torque target value and the motor rotation number. The data of the memories 15a, 15b, and 15c are updated. Data allocated to the instant rotation angle is, as a target current value, outputted to the comparison circuit 16.

So long as the SR motor 1 is required to be driven, the steps ranging from 52 through 66 are executed in repetition fashion in cycles.

When the signal VSs, which is indicative of on/off condition of the ignition key switch VSC and which is read at step 52, is switched to L (off), the program routine goes to step 68 from step 53. Since the result of step 68 reveals that the data in the resister Fvsc is "1" (i.e., the driving power supply relay PR is on), the driving power supply relay PR is made to be off (step 69). And, it is checked whether or not the driving voltage Vp (the output analogue voltage of insolating voltage conversion circuit VCT) is less than 1 volt (step 70). If the result is false, the SR motor 1 is made not to be driven substantially, and the target current for each phase coil is calculated and is fed to the waveform generation circuit in order to discharge the capacitor Cap (step 75).

If the voltage across the aforementioned capacitor Cap becomes less than 1 volt, which results from the aforementioned motor energization, the CPU 11 stores the data target current of 0 amperes in each phase resister and gives this to each of the controllers C1, C2, and C3 to indicate stopping the energization (step 72). Then, the control power supply relay CR is turned off (step 73), and the resister Fvsc is cleared (step 74). Thereafter, the program routine enters a waiting condition by circulating through steps 52, 53, 68, and 52 until the ignition key switch VSC is turned on.

Next, how the aforementioned torque correction coefficient Kt is calculated (steps 63, 64, and 67) will be detailed. First, a check is made as to whether or not the SR motor 1 is in a locked condition (e.g., whether the rotation number of the SR motor 1 is equal to or less than 10 rpm) (step 63). In this embodiment, the threshold value is set to be 10 rpm. If the SR motor 1 is not in a locked condition, the switching element of the switching module is free from it heat breakage, the required torque value obtained at step 61, as it is, is used as the torque target value (steps 64 and 65).

If the SR motor 1 is found to be in a locked condition, the program routine goes to step 67 to "calculation of Kt for limiting torque" at which step the correction coefficient Kt is calculated for avoiding thermal breakage of the switching element of the switching module, and for determining the torque target value which is as close as possible to the required torque value calculated at step 61. The details are shown in FIG. 3.

Figure 3:
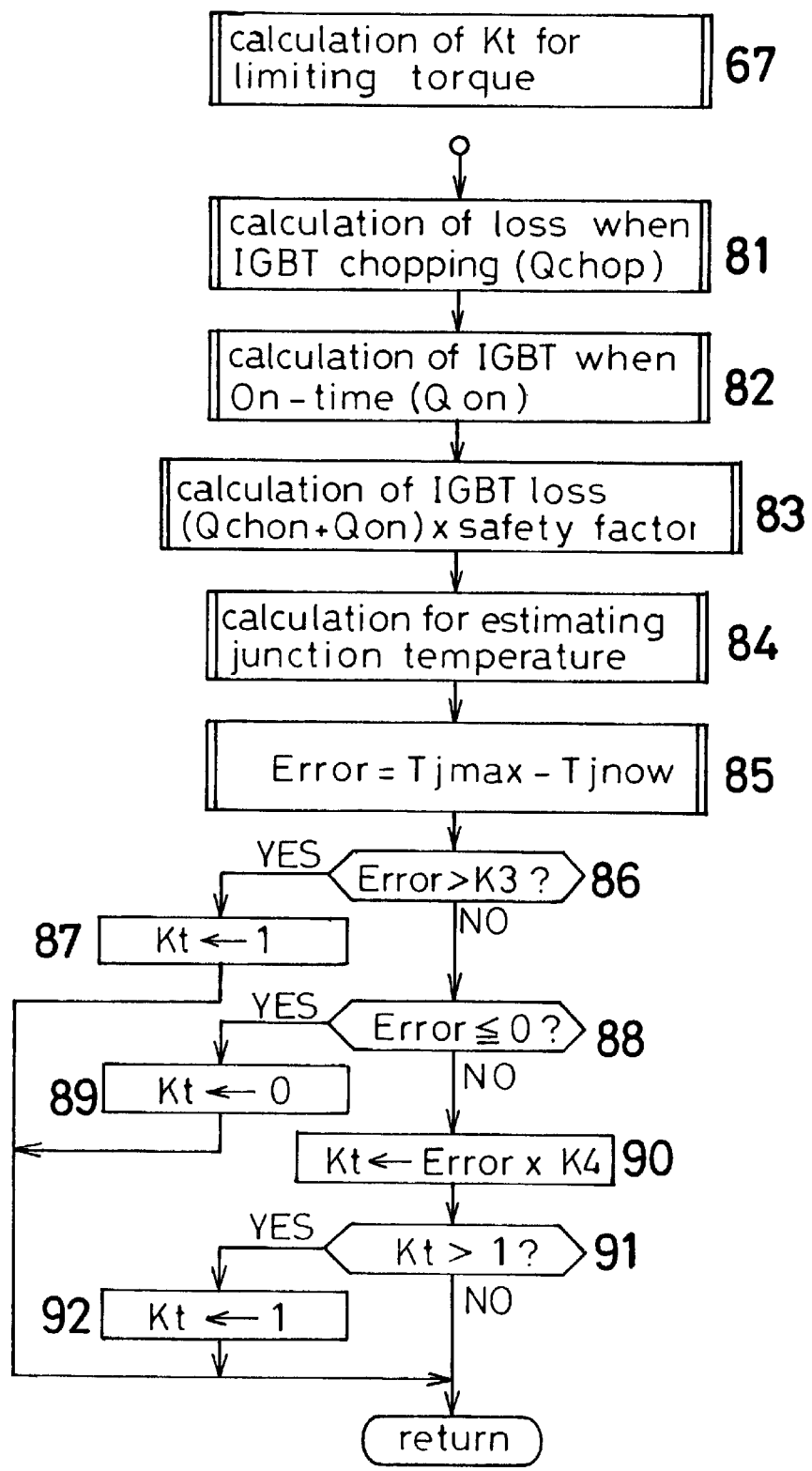
FIG. 3 illustrates a flowchart that is indicative of a program routine of step 67 for calculating Kt for torque limiting.

With reference to FIG. 3, at step 67 for "calculation of Kt for limiting torque", first of all, a chopping loss Qchop[W] of an insulating gate type bipolar transistor (IGBT) is calculated as follows (step 81) which acts as the switching element of one of the drivers 18, 19, and 20 for the respective phase coils:

$$Q\text{chop}=\text{Current}I[A]\times\text{Voltage}V[V]\times\text{coefficient}Kc,$$

where Kc is the chopping coefficient calculated based on chopping frequency, current rising-up speed, and current falling-down speed.

Next, at step 82, an On-loss of the insulating gate type bipolar transistor (IGBT), which is a loss thereof when being energized is calculated as follows:

$$Q\text{on}=V\text{ceo}\times\text{Current}I[A]+R\text{on}\times I.\text{sup}.2[A],$$

where Vceo is the on-voltage between the collector and emitter of the IGBT at zero amperes, and Ron is the on-resister of the IGBT.

Next, at step 83, the following calculation is made of a total electric power loss Lt [W] at one of the drivers 18, 19, and 20 that is for the phase coil to be energized:

$$Lt=(Q\text{chop}+Q\text{on}+D\text{loss}\times 2)\times\text{safety factor},$$

where Dloss is the diode loss.

An estimation of an instant temperature Tjnow [° C.] is made on the basis of the following formula at step 84:

$$Tj\text{goal}=Lt\times\text{heat resister }[°\text{ C.}/w],$$

where Tjgoal is the saturation temperature [° C.] of the insulating gate type bipolar transistor (IGBT);

$$Tj\text{now}=(Tj\text{goal}-Tj\text{now}0))\times(1-e.\text{sup}.(-t/\tau))+T_0,$$

where Tjnow0 is the last value of Tjnow, $\tau$ is the experimentally obtained time constant of temperature raise, and $T_0$ is the temperature detected by the temperature sensor.

Next, at step 85, a temperature difference as a temperature allowance is calculated as follows:

$$\text{Error}=Tj\text{max}-Tj\text{now},$$

where Tjnow is the instant junction temperature, and Tjmax is the upper temperature limit of the IGBT.

If the temperature difference Error is in excess of a predetermined value K3 which is indicative that the temperature allowance is large, the torque correction coefficient is set to be K1 (steps 86 and 87). If the temperature difference Error is equal or less than 0, which estimates that the instant junction temperature Tjnow is equal to or greater than the upper temperature limit of the IGBT, the torque correction coefficient Kt is set to be zero (termination of the energization) (steps 88 and 89). If the temperature difference Error is greater than 0 and is not in excess of the predetermined value K3, Kt is calculated by the formula:

$$Kt=\text{Error}\times K4,$$

where K4 is a coefficient. And if the resulting Kt is in excess of 1, Kt is reset to be 1 (steps 90 to 92 inclusive). That is to say, under the P control (proportional control) mode wherein the difference Error is regarded as an error value, the correction coefficient Kt is set to be in excess of 0 and not greater than 1.

According to the foregoing steps, multiplying the required torque value calculated at step 61 with the coefficient Kt ($0 \leq Kt \leq 1$) constitutes the target torque value. Such a determination of the correction coefficient is made so as to attain a sufficient motor output torque while the prevention of thermal breakage of the switching element in the module is being ensured. Such a control makes it possible to obtain the torque even if the switching element of the switching module IPM becomes close to its temperature limit while still protecting the switching element.

Figure 4:
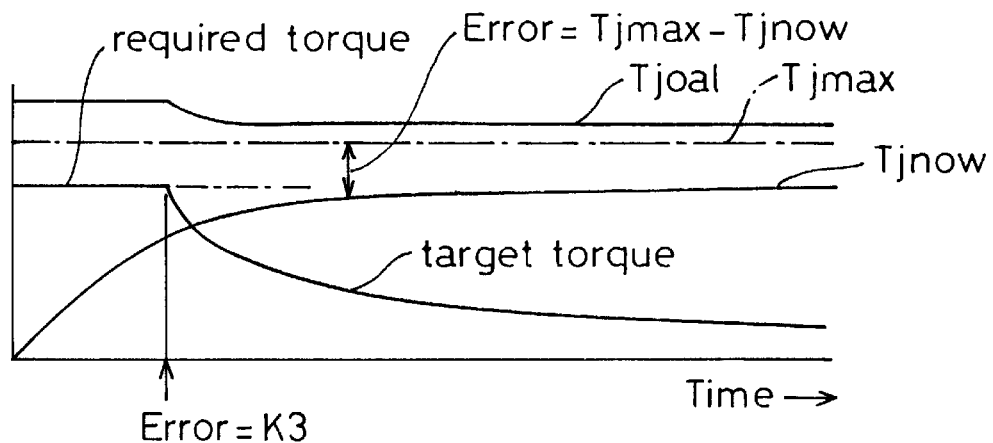
FIG. 4 is a graph showing how a target torque changes with the passing of time that is the multiple of Kt with a required torque.

FIG. 4 shows how the torque target value (=Kt×torque required value) changes with passing of time in the case where the torque required value is constant at a higher level and the motor rotates at a speed of less than 10 rpm while being energized with a high current in continuous fashion. By virtue of the proportional control wherein the relation Kt=Error×K4 is established upon establishment of Error=Tjmax−Tjnow, Kt becomes less than 1 (Kt<1), and Kt becomes lower as the Error decrease, which results in that the torque target value decreases even though the required torque value does not change, thereby preventing the temperature of the switching element of the module from rising.

Instead of the foregoing temperature estimation on the basis of detecting current flowing through the phase coils 1a, 1b, and 1c of the electric motor 1 with the current sensors 2, 3, and 4, respectively, an alternate temperature estimation is possible on the basis of energization indication currents to be fed from the current controller C1, C2, and C3 to the phase coils 1a, 1b, and 1c, respectively. In such a design, as the foregoing current I [A], the current target value which is fed to the comparison circuit 16 at step 66 is available.

The invention has thus been shown and described with reference to a specific embodiment, however, it should be understood that the invention is in no way limited to the details of the illustrated structures but changes and modifications may be made without departing from the scope of the appended claims.

What is claimed is:

1. A motor driving control device comprising:
   a switching module having therein a power switching element for energizing an electric coil of a motor;
   energization indication means for providing an energization indication signal to the switching module for energization of the electric coil;
   calculation means for calculating a saturation temperature of the switching element generated by a heat generated by an electric loss that results from continuous energization of the electric coil, the calculation means calculating an inner temperature of the switching element based on the calculated saturation temperature and a time constant $\tau$ of a temperature rise by the generated heat assuming that the temperature rise is made in first order lag in response to the increase of heat capacity; and
   means for decreasing a current to be applied to the electric coil in accordance with a temperature difference between an upper limit temperature of the power switching element and the calculated inner temperature of the power switching element, wherein the current to be applied to the electric coil through the energization indication means is decreased when the temperature difference is equal to or below a predetermined value, the current decrease becoming bigger as the temperature difference becomes smaller.

2. The motor driving control device as set force in claim 1, further comprising detection means for detecting a rotational speed of the motor; wherein, only when the motor rotational speed is less than a motor lock judging threshold value, the calculation means for calculating the saturation temperature calculates the electric loss on the basis of a specification of the power switching element and amounts of energizing current and voltage, and calculates the inner temperature of the power switching element; and wherein the current decreasing means decreases the current only when the motor rotational speed is less than the motor lock judging threshold value.

3. The motor driving control device as set force in claim 2, wherein the current decreasing means decreases the current under proportional control based on the difference between the inner temperature and the upper temperature limit.

4. A motor driving control device comprising:
   a switching module having therein a power switching element for energizing an electric coil of a motor;
   an energization indicator that provides an energization indication signal to the switching module for energization of the electric coil;
   a calculator that calculates a saturation temperature of the switching element generated by a heat generated by an electric loss that results from continuous energization of the electric coil, the calculator further calculates an inner temperature of the switching element based on the calculated saturation temperature and a time constant $\tau$ of a temperature rise by the generated heat assuming that the temperature rise is made in first order lag in response to the increase of heat capacity; and
   a current controller that decreases a current applied to the electric coil in accordance with a temperature difference between an upper limit temperature of the power switching element and the calculated inner temperature of the power switching element, wherein the current applied to the electric coil through the energization indicator is decreased when the temperature difference is equal to or below a predetermined value, the current decrease becoming bigger as the temperature difference becomes smaller.

5. The motor driving control device as set force in claim 1, further comprising a detector that detects a rotational speed of the motor; wherein, only when the motor rotational speed is less than a motor lock judging threshold value, the calculator calculates the electric loss on the basis of a specification of the power switching element and amounts of energizing current and voltage, and calculates the inner temperature of the power switching element; and wherein the current controller decreases the current only when the motor rotational speed is less than the motor lock judging threshold value.

6. The motor driving control device as set force in claim 4, wherein the current controller decreases the current under proportional control based on the difference between the inner temperature and the upper temperature limit.

7. The motor driving control device as set force in claim 4, wherein the power switching element includes a pair of insulating type bipolar transistors.

8. A motor driving control device comprising:
   a switching module having therein a power switching element for energizing an electric coil of a motor;
   an energization indicator that provides an energization indication signal to the switching module for energization of the electric coil;
   a calculator that calculates a saturation temperature of the switching element generated by a heat generated by an electric loss, the calculator further calculates an inner temperature of the switching element based on the calculated saturation temperature and a time constant $\tau$ of a temperature rise by the generated heat based on the heat capacity; and
   a current controller that decreases a current applied to the electric coil in accordance with a temperature difference between an upper limit temperature of the power switching element and the calculated inner temperature of the power switching element, wherein the current applied to the electric coil through the energization indicator is decreased when the temperature difference is equal to or below a predetermined value, the current decrease becoming bigger as the temperature difference becomes smaller.

* * * * *